US005777050A

United States Patent [19]
Friederichs et al.

[11] Patent Number: 5,777,050
[45] Date of Patent: Jul. 7, 1998

[54] PROCESS FOR POLYMERIZING ETHYLENE IN THE PRESENCE OF A CATALYST COMPOSITION

[75] Inventors: Nicolaas H. Friederichs, Brunssum; Johannus A. M. van Beek, Maastricht; Rutgerus A. J. Postema, Geleen; Joseph A. J. Hahnraths, Heerlen, all of Netherlands

[73] Assignee: DSM N.V., Heerlen, Netherlands

[21] Appl. No.: 929,467

[22] Filed: Sep. 15, 1997

Related U.S. Application Data

[63] Continuation of Ser. No. 622,673, Mar. 26, 1996, abandoned, and a continuation of PCT/NL94/00233, Sep. 26, 1994.

[30] Foreign Application Priority Data

Sep. 27, 1993 [BE] Belgium ............................. 09301005

[51] Int. Cl.$^6$ ............................. C08F 4/06; C08F 4/44; C08F 4/60; B01J 31/00
[52] U.S. Cl. ............................. 526/123.1; 526/124.8; 526/124.9; 526/128; 526/132; 526/142; 502/132; 502/133; 502/125; 502/126
[58] Field of Search ............................. 526/123.1, 124.8, 526/124.9, 128, 132, 142

[56] References Cited

U.S. PATENT DOCUMENTS

| | | | |
|---|---|---|---|
| 4,485,035 | 11/1984 | Shiga et al. | 526/142 |
| 4,604,374 | 8/1986 | Lund | 502/115 |
| 4,657,997 | 4/1987 | Best | 526/142 |
| 5,045,612 | 9/1991 | Schell, Jr. et al. | 526/142 |

FOREIGN PATENT DOCUMENTS

| | | |
|---|---|---|
| 0 126 515 | 11/1984 | European Pat. Off. |
| 0 185 520 A1 | 6/1986 | European Pat. Off. |
| 2 464 965 | 3/1981 | France . |
| 2 057 469 | 4/1981 | United Kingdom . |

*Primary Examiner*—Glenn Caldarola
*Assistant Examiner*—J. Pasterczyk
*Attorney, Agent, or Firm*—Cushman Darby & Cushman IP Group of Pillsbury Madison & Sutro LLP

[57] ABSTRACT

A process is disclosed for the homopolymerization of ethylene or copolymerization of ethylene with one or more α-olefins with 3–12 carbon atoms and optionally one or more non-conjugated dienes in solution in the presence of a catalyst system containing a catalyst A and a cocatalyst B, of which catalyst A is obtained by reacting, under inert conditions, the following components:

(a) one or more organomagnesium compounds with alkyl and/or alkoxy groups bonded to the magnesium,
(b) one or more chlorine-containing organoaluminum compounds and/or boron compounds,
(c) one or more oxygen-containing compounds,
(d) one or more transition metal compounds with alkyl, alkoxy and/or halogenide groups bonded to the transition metal;

in the order (a), (b), (c), (d), or (a), (b), (d), (c), or (a), (b) and a reaction product of (c) and (d)=(e), wherein the atomic ratio of aluminum and/or boron of (b) to magnesium of (a) is between 2 and 15, the atomic ratio of magnesium of (a) to transition metal from (d) or (e) is between 3 and 100, the atomic ratio of oxygen from (c) or (e) to the magnesium of (a) is between 0.1 and 5, and/or washing the catalyst A. One or more organoaluminum compounds and/or boron compounds can be used as cocatalyst B.

14 Claims, No Drawings

PROCESS FOR POLYMERIZING ETHYLENE IN THE PRESENCE OF A CATALYST COMPOSITION

RELATED APPLICATION

This is a continuation of application Ser. No. 08/622,673, filed on Mar. 26, 1996, which was abandoned upon the filling hereof and a continuation of PCT/NL94/00233 filed on Sep. 26, 1994.

FIELD OF THE INVENTION

The invention relates to a catalyst system for the homopolymerization of ethylene or copolymerization of ethylene with one or more α-olefins with 3–12 carbon atoms and optionally one or more non-conjugated dienes in solution, this catalyst system comprising a catalyst A and a cocatalyst B, of which catalyst A can be obtained by reacting the following components:

(a) one or more organomagnesium compounds with alkyl and/or alkoxy groups bonded to the magnesium,
(b) one or more chlorine-containing organoaluminium compounds and/or boron compounds,
(c) one or more oxygen-containing compounds,
(d) one or more transition metal compounds with alkyl, alkoxy and/or halogenide groups bonded to the transition metal;

in the order (a), (b), (c), (d), or (a), (b), (d), (c), or (a), (b) and a reaction product of (c) and (d)=(e); wherein the atomic ratio of aluminium and/or boron of (b) to magnesium of (a) is between 2 and 15, the atomic ratio of magnesium of (a) to transition metal from (d) or (e) is between 3 and 100, the atomic ratio of oxygen from (c) or (e) to the magnesium of (a) is between 0.1 and 5, and following which catalyst A is washed; and as cocatalyst B one or more organoaluminium compounds and/or boron compounds can be used. The invention further relates to the (co)polymerization of ethylene using this catalyst.

DESCRIPTION OF RELATED ART

Polymerization of ethylene can take place in the gas-phase, in solution, in bulk or in suspension. Solution and suspension polymerization take place in a solvent and in a dispersion medium, respectively. Suspension polymerization is carried out at a temperature below the temperature at which the formed polyethylene dissolves. Solution polymerization takes place at temperatures that are higher than the polyethylene dissolution temperature. In general, these are temperatures above 135° C.

Depending on the process chosen, gas-phase, solution, bulk or suspension, different types of polyethylene can be made. The advantage of the gas-phase process is that there is no need to use a solvent or a dispersion medium, which must be removed and purified. The disadvantage of such a process is its lower flexibility. A high flexibility of a process means a short transition time from one polyethylene product type to another. Other limitations are that among others, no (very) low density polyethylenes (density lower than ±910 kg/m$^3$) can be produced economically, and that the use of comonomers, especially 1-octene is limited. A solution process on the other hand is characterized by its high flexibility. The linear low density and very low density polyethylenes that can be prepared in a solution process are eminently suitable for the production of films. The toughness of the polyethylene can be controlled by incorporation of various comonomers. Both toughness and the chemical resistance, also referred to as the environmental stress crack resistance (ESCR), improve by the use of various comonomers, the order being 1-butene<1-hexene<1-octene.

In a solution polymerization process the polymerization temperatures are as a rule far above 135° C. This has a number of advantages. The polymerization reaction of polyethylene is exothermic, which implies that the removal of the heat of polymerization is an essential problem. In principle it is possible to cool via the wall or by means of cooling devices in the reactor, but this may lead to polymer deposits on the cooling surfaces, especially when the cooling temperature is below 150° C., so it is practically almost impossible to cool the reactor content.

As a consequence the reactor is operated autothermally, this means that the heat of reaction is absorbed by the reaction medium. In order to minimize the solvent to be evaporated, the temperature difference over the reactor must be maximal, so a high reactor temperature and a low feed temperature are used.

With a high reactor temperature the necessity of heating the polymer solution before evaporation can be reduced or may even be absent.

The high temperature catalyst systems must be so active as to have sufficient residual activity at polymerization temperatures of 135° C. and higher. However, at such high temperatures it is difficult to make polymers having a sufficiently high molecular weight.

U.S. Pat. No. 5,045,612 already discloses such a catalyst system for solution polymerization. In this system, however, the activator is always added after the organomagnesium compound, before the other catalyst components are added. However, the activity of this catalyst system is not satisfactory. The shorter the residence time, the faster a change can be made from the production of one polyethylene type to another, and as already stated, the flexibility of the solution process is one of its main advantages.

SUMMARY AND OBJECTS OF THE INVENTION

The object of the invention is to provide a catalyst system which not only has a very high activity at high temperatures but which also makes it possible to control the comonomer conversions.

This object is achieved by a catalyst system for the homopolymerization of ethylene or copolymerization of ethylene with one or more α-olefins with 3–12 carbon atoms and optionally one or more non-conjugated dienes in solution, this catalyst system comprising a catalyst A and a cocatalyst B, of which catalyst A can be obtained by reacting the following components:

(a) one or more organomagnesium compounds with alkyl and/or alkoxy groups bonded to the magnesium,
(b) one or more chlorine-containing organoaluminium compounds and/or boron compounds,
(c) one or more oxygen-containing compounds,
(d) one or more transition metal compounds with alkyl, alkoxy and/or halogenide groups bonded to the transition metal;

in the order (a), (b), (c), (d), or (a), (b), (d), (c), or (a), (b) and a reaction product of (c) and (d)=(e); wherein the atomic ratio of aluminium and/or boron of (b) to magnesium of (a) is between 2 and 15, the atomic ratio of magnesium of (a) to transition metal from (d) or (e) is between 3 and 100, the atomic ratio of oxygen from (c) or (e) to the magnesium of (a) is between 0.1 and 5, and following which washing catalyst A; and as cocatalyst B one or more organoaluminium compounds and/or boron compounds can be used.

Thus, a higher activity is achieved leading to short residence times. In addition, the use of such a catalyst system according to the invention results in higher (controllable) comonomer conversions and in polymers having a sufficiently high molecular weight. Control of the comonomer conversions can be effected inter alia by adding the oxygen-containing compound to the transition metal compound at different stages in the preparation of catalyst A. The use of this catalyst system in the (co)polymerization of ethylene also results in a substantial reduction of the residual chlorine and titanium contents of the polyethylene.

European patent application EP-A-0126515 discloses a catalyst system that is active also at very high temperatures. This catalyst system uses an oxygen-containing compound as activator. This activator is always added to the system after the organoaluminium compound and the organomagnesium compound have been combined but before the transition metal compound is added. When all compounds have been combined, the resulting solid is not washed but used as such and fed to the reactor. There is no need to wash this catalyst system, but it does leave relatively high residual chlorine (>120 ppm) and titanium (>10 ppm) contents in the polyethylene. This has an adverse effect on the colour and the purity of the polyethylene. In addition, the stability of the polyethylene is adversely affected and the high chlorine content causes increased corrosion of the process equipment. The last aspects can be suppressed by adding large amounts of corrosion inhibitor and/or stabilizer to the polyethylene. With the catalyst system as disclosed in EP-B-0126515 the molecular weight distribution can be controlled only to a limited extent. If ethylene is copolymerized with one or more aolefins to yield linear low density polyethylene (LLDPE) or very low density polyethylene (VLDPE), relatively large amounts of α-olefin are needed. This, then, leads to the formation of undesired by-products, chlorinated or non-chlorinated oligomers of the monomers, internal olefins (these are olefins in which the unsaturation is not at the terminal carbon atom), and alkanes. These by-products have an adverse effect on process operation in the plant and must therefore be removed from the reaction mixture at regular intervals. The costs involved are high.

DETAILED DESCRIPTION OF THE INVENTION

As organomagnesium compound (a), in particular a dialkylmagnesium compound is suitable, an alkoxyalkylmagnesium compound or a dialkoxymagnesium compound, in which the alkyl or alkoxy groups can contain 1–20 carbon atoms. A hydrocarbon-soluble compound is preferred. Examples of such compounds are di(n-butyl) magnesium, n-butyl-sec-butylmagnesium, diisopropylmagnesium, di(n-hexyl)magnesium, isopropyl-n-butylmagnesium, ethyl-n-hexylmagnesium, ethyl-n-butylmagnesium, di(n-octyl)magnesium, butyl-octylmagnesium, diethoxymagnesium, dibutoxymagnesium, n-butyl-n-butoxymagnesium, octyl-n-butoxymagnesium, etc. If a hydrocarbon-soluble organomagnesium compound is used, it is also possible to use complexes of the organomagnesium compound with aluminium. Complexes with ether can also be used. Mixtures of all these compounds are also possible.

Preferably, ethylbutylmagnesium, butyloctylmagnesium, dibutylmagnesium or dihexylmagnesium is used, and these can optionally be converted to an alkyl-alkoxymagnesium compound with at most two mole equivalents of an alcohol with respect to the magnesium.

Compounds suitable for use as (b) are in particular compounds that satisfy the general formula $M(R)_{3-m}X_m$, where M is aluminium or boron, R is a hydrocarbon group or an alkoxy group with 1–20 carbon atoms, X is a halogen atom and m has a value of 1–2. In the event that m=1, the alkyl and/or alkoxy groups of the aluminium may be the same or different. Mixtures of these compounds can also be used.

Preferably, use is made of diethylaluminiumchloride, sesquiethylaluminiumchloride, monoethylaluminiumchloride or mixtures thereof.

As oxygen-containing compound (c) use can be made, for example, of alcohols, glycols, silanols and ethers. Examples of such compounds are hexanol, octanol, decanol, 2-ethylhexanol, triphenylsilanol, diethylether, t-butylmethylether, anisole, 1,1,3,3-tetraphenyldisiloxane-1, 3-diol, 1,2-dihydroxyethane, 1,3-dihydroxypropane and 2-ethyl-hexane-1,3-diol, etc. Mixtures of these compounds can also be used.

Preferably, use is made of hexanol, decanol, 2-ethylhexanol, t-butylmethylether, diethylether, triphenylsilanol, or mixtures of these.

As transition metal compound (d), both trivalent and tetravalent titanium compounds can be used. These titanium compounds satisfy the general formulae $Ti(OR^1)_{4-n}X^1_n$ and $Ti(OR^2)_{3-m}X^2_m$, respectively, where $R^1$ and $R^2$ are the same or different and represent hydrocarbon radicals with 1–20 carbon atoms, $X^1$ and $X^2$ are halogen atoms, $0 \leq n \leq 4$ and $0 \leq m \leq 3$. Titanium complexes such as $TiCl_3.3$ decanol, $TiCl_3.3$ tetrahydrofuran, $TiCl_3.3$ pyridine can also be used. Preferably, use is made of tetrabutoxytitanium (TBT), and/or titaniumtetrachloride ($TiCl_4$).

Compounds of other transition metals, such as vanadium, zirconium or hafnium are also suitable. Examples of such compounds are $VCl_4$, $VOCl_3$, $ZrCl_4$, $Zr(OiPr)_4$, $Zr(OBu)_4$, $Hf(OBu)_4$ and $HfCl_4$. Mixtures of compounds with different transition metals can also be used.

In the preparation of catalyst A of the catalyst system, the atomic ratio of aluminium and/or boron of component (b) to the magnesium of component (a) is between 2 and 15, preferably between 2.5 and 10.

The atomic ratio of magnesium of component (a) to transition metal of component (d) is generally between 3 and 100, preferably between 3 and 50.

The atomic molar ratio of the oxygen-containing compound, component (c), to the magnesium, component (a), is between 0.1 and 5, preferably between 0.5 and 4.

The preparation of the catalyst system can for example further take place as follows. The organoaluminium halogen compound or the boron compound (b) is added to the organomagnesium compound (a). The entire amount can be added portion- or dropwise while stirring at a temperature between −20° C. and 100° C. After this, there are at least three ways to continue the preparation of catalyst A. In the first place the oxygen-containing compound (c) can be added dropwise to the mixture that has already formed, this taking place while stirring in a period of time ranging from some minutes to some hours at a temperature that can vary between −20° C. and 100° C. Subsequently, the transition metal compound (d) is added, which can also be done portion- or dropwise. A second possibility is to add component (d), dissolved or suspended in (c) and optionally after dilution within an inert dispersion medium, to the reaction product of components (a) and (b) while stirring for some time at a temperature between −20° C. and 100° C. In the third place it is possible to add component (d) to the reaction product of (a) and (b), followed by rapid addition (usually within 5 minutes) of component (c). After this, stirring is applied for some hours at a temperature between 0° and 100° C. The catalyst system is then separated by means of filtration or decanting and washed with an inert dispersion medium.

In addition to the catalyst system as described above, a cocatalyst B is fed to the reactor in order to activate the catalyst. One or more organoaluminium compounds and/or boron compounds can be used. Examples are triethylaluminium (TEA), trioctylaluminium (TOA), isoprenylaluminium (IPRA), diethylaluminiumchloride (DEAC), sesquiethylaluminiumchloride (SEAC), diethylaluminiumhydride (DEAH), diethylaluminiumethoxide (DEALOX), monoethylaluminium-dichloride (MEAC), methylaluminoxane (MAO) and triethylboron or mixtures thereof. TEA and DEAC are preferred.

The catalyst system and the cocatalyst can be fed to the polymerization reactor either separately or in combination.

The invention furthermore relates to a process for the homopolymerization of ethylene or copolymerization of ethylene with one or more α-olefins with 3–12 carbon atoms and optionally one or more non-conjugated dienes. Particularly suitable α-olefins are propylene, 1-butene, 1-hexene and 1-octene. Examples of suitable dienes are 1,4-pentadiene, 1,4-hexadiene, 1,5-hexadiene, 1,6-heptadiene, 1,7-octadiene, 1,8-nonadiene and 1,9-decadiene.

The catalyst system of the subject invention can in principle be used in all known types of polymerization processes; as already mentioned these are gas-phase, suspension, bulk and solution processes. However, this catalyst system is particularly suitable for solution polymerization. Polymerization then takes place at temperatures between 150° C. and 260° C.

As a dispersion medium, both in the preparation of the catalyst and in the polymerization, any liquid that is inert with respect to the catalyst system can be used. One or more saturated, linear or branched aliphatic hydrocarbons, such as butanes, pentanes, hexanes, heptanes, pentamethylheptane or petroleum fractions such as light or regular gasoline, naphtha, kerosene, gas oil can be used for this purpose. Aromatic hydrocarbons, such as benzene and toluene, can be used, but for cost price considerations as well as for safety reasons such solvents will generally not be used in technical-scale production. In technical-scale polymerizations, therefore, as solvent use is preferably made of the inexpensive aliphatic hydrocarbons or mixtures thereof, as marketed by the petrochemical industry.

The polymer solution obtained in the polymerization can be processed in a way known per se. Generally, the catalyst is deactivated at some point of the polymer recovery phase. Deactivation also takes place in a way known per se, such as for example by addition of an alcohol.

Polymerization can take place at atmospheric pressure but also at elevated pressure, up to 300 MPa, in a continuous or discontinuous manner. Preferably, polymerization takes place at pressures between 0.1 and 40 MPa, in particular between 1 and 18 MPa.

The molecular weight of the polymer can be controlled in the known manner by addition of hydrogen or other chain length regulators, such as dialkylzinc.

With the catalyst system according to the invention polyethylene can be produced under conditions as mentioned above, in a very short time, which means a short residence time in the reactor, with a high activity. This polyethylene has the customary high molecular weights, but in addition extra low contents of catalyst residues. The molecular weight distribution can be controlled, in particular by means of the amounts components (c) and (d), or (e), and the way of preparation of catalyst A.

Polymerization can also be effected in several stages, both in series and in parallel. In these different stages it is possible to vary the catalyst composition, temperature, hydrogen concentration, pressure, residence time, etc., if desired. This provides additional means of controlling the molecular weight distribution.

The present invention will be elucidated in the following examples and comparative experiments, without being limited to them. The examples and comparative experiments serve to illustrate the high activity of the catalyst system at short residence times in the reactor. The density (d) was determined according to ASTM standard D792-66. The melt index (MI) was determined according to ASTM standard D1238, condition E.

The flow index (FI) is $I_{21.6}/[I_{2.16}]^{0.9}$. $I_{21.6}$ having been determined according to ASTM standard D1238 and $I_{2.16}$ having been determined according to ASTM standard D1238, condition E.

EXAMPLE I

Catalyst preparation

During the entire preparation air and moisture were excluded and an inert nitrogen atmosphere was maintained. During all reactions stirring was applied, use being made of a glass stirring rod.

125 ml of a 0.9M solution of butyloctylmagnesium in heptane (BOMAG-A®, Witco) was added at room temperature to a solution of 5 ml butanol in 400 ml gasoline (a mixture of aliphatic hydrocarbons with a boiling range of 65°–70° C.). This reaction mixture was then stirred for 30 minutes at room temperature. Then 65 ml SEAC (pure, Witco) was added and the mixture was heated for two hours at 60° C. After cooling to room temperature a solution of 2.5 ml TBT in 50 ml 2-ethylhexanol was added, which was again followed by heating for two hours at 60° C. After the reaction mixture had again been cooled to room temperature, it was passed over a glass filter and the solid part was separated from the liquid part. The solid part, catalyst A, was washed five times with 150 ml gasoline. Catalyst A was then suspended in gasoline for use as a slurry. The various elements of the catalyst prepared were present in the following ratios:

$Al_{(b)}:Mg_{(a)}=5$
$Mg_{(a)}:Ti_{(d)}=15$
$O_{(c)}:Mg_{(a)}=3$

EXAMPLE II

Catalyst preparation

The preparation method was the same as described in Example I, but with 25 ml 2-ethylhexanol instead of 50 ml 2-ethylhexanol.

Ratios:
$Al_{(b)}:Mg_{(a)}=5$
$Mg_{(a)}:Ti_{(d)}=15$
$O_{(c)}:Mg_{(a)}=1.5$

EXAMPLE III

Catalyst preparation

The same preparation method as described in Example I, but now 2-ethylhexanol (c) was added separately from TBT (d) five minutes after TBT had been added to the reaction mixture.

Ratios:
$Al_{(b)}:Mg_{(a)}=5$
$Mg_{(a)}:Ti_{(d)}=15$
$O_{(c)}:Mg_{(a)}=3$

EXAMPLE IV

Catalyst preparation

The same preparation method as described in Example III, but with 25 ml 2-ethylhexanol (c) instead of 50 ml 2-ethylhexanol.

Ratios:
$Al_{(b)}:Mg_{(a)}=5$
$Mg_{(a)}:Ti_{(d)}=15$
$O_{(c)}:Mg_{(a)}=1.5$

Comparative Experiment A

Catalyst preparation

The same preparation method as described in Example I, but without 2-ethylhexanol (c) and with 3.8 ml TBT.

Ratios:
$Al_{(b)}:Mg_{(a)}=5$
$Mg_{(a)}:Ti_{(d)}=10$
$O_{(c)}:Mg_{(a)}=0$

EXAMPLE V

Catalyst preparation

The same preparation method as described in Example I, but without the butanol. As component (b) 38.5 ml SEAC was used, while, in contrast with Example III, first 2-ethylhexanol (c) was added to the reaction mixture and then the TBT (d).

Ratios:
$Al_{(b)}:Mg_{(a)}=3$
$Mg_{(a)}:Ti_{(d)}=15$
$O_{(c)}:Mg_{(a)}=3$

Comparative Experiment B

Catalyst preparation

The same preparation method as described in Example V, without 2-ethylhexanol (c) but with butanol, as described in Example I.

Ratios:
$Al_{(b)}:Mg_{(a)}=3$
$Mg_{(a)}:Ti_{(d)}=15$
$O_{(c)}:Mg_{(a)}=0$

EXAMPLE VI

Catalyst preparation

The same preparation method as described in Example II, but with 65 ml SEAC and 25 ml 2-ethylhexanol. In contrast with Example II, first 2-ethylhexanol (c) was added to the reaction mixture and then the TBT (d).

Ratios:
$Al_{(b)}:Mg_{(a)}=5$
$Mg_{(a)}:Ti_{(d)}=15$
$O_{(c)}:Mg_{(a)}=1.5$

EXAMPLE VII

Polymerization

In a continuous polymerization process for the production of an ethylene-octene copolymer the catalyst prepared according to Example I was fed as a suspension in gasoline to a 1-liter reactor filled entirely with gasoline. The production rate was 1.35 kg polyethylene per hour. The cocatalyst, triethylaluminium (TEA, 0.15 mmol/l) was added to the catalyst and mixed with it for two seconds just before to the reactor. Ethylene was fed at a rate of 1040 nl/h, and octene at 800 g/h. The reaction temperature was 185° C. and the reactor pressure 9 MPa. Hydrogen was supplied at a rate of 0.20 nl/h.

The LLDPE produced was found to contain 3 ppm Ti and 106 ppm Cl, with d=919 kg/m$^3$, MI=4.7 dg/min, FI=40.

EXAMPLE VIII

Polymerization

Polymerization took place as described in Example VII. However, the cocatalyst was supplied separately from the catalyst. The reactor temperature was 187° C. and hydrogen was supplied at a rate of 0.30 nl/h. The polyethylene produced was found to have a residual content of 3 ppm Ti and 91 ppm Cl, with d=916 kg/m$^3$, MI=3.2 dg/min and FI=34.

EXAMPLE IX

Polymerization

Polymerization took place as described in Example VIII, with the catalyst prepared according to Example II being supplied to the reactor. The reactor temperature was 186° C.

The polyethylene produced was found to contain 4 ppm Ti and 125 ppm Cl as catalyst residues. The polyethylene produced had a d=911 kg/m$^3$, an MI=3.3 dg/min and an FI=35.

EXAMPLE X

Polymerization

Polymerization took place as described in Example VIII using the catalyst prepared according to Example III at a reactor temperature of 187° C. The residual contents in the LLDPE produced were 4 ppm Ti and 133 ppm Cl. The LLDPE produced had a d=915 kg/m$^3$, an MI=8.1 dg/min and an FI=44.

EXAMPLE XI

Polymerization

Polymerization took place as described in Example VIII using the catalyst prepared according to Example IV at a reactor temperature of 187° C. The LLDPE produced had a d=909 kg/m$^3$, an MI=6.1 dg/min and an FI=50, while containing 4 ppm TI and 159 ppm Cl as residual contents.

Comparative Experiment C

Polymerization

The polymerization was carried out as described in Example VII using the catalyst prepared according to Comparative Experiment A.

As catalyst residues 8 ppm Ti and 154 ppm Cl were found in the LLDPE produced, which had a d=921 kg/m$^3$, an MI=4.8 dg/min and an FI=36.

Comparative Experiment D

Polymerization

The polymerization was carried out as described in Example VII using the catalyst prepared according to Comparative Experiment B.

The LLDPE had a d=921 kg/M$^3$, an MI=5.6 dg/min and an FI=36 while containing 10 ppm Ti and 286 ppm Cl as residual contents.

EXAMPLE XII

Polymerization

The polymerization was carried out as described in Example VII using the catalyst prepared according to Example V at a reactor temperature of 188° C. The residual contents in the LLDPE amounted to 8 ppm Ti and 270 ppm Cl. The LLDPE had a d=911 kg/m$^3$, an MI=2.3 dg/min and an FI=40.

EXAMPLE XIII

Polymerization

The polymerization was carried out as described in Example VIII using the catalyst prepared according to Example VI at a reactor temperature of 187° C. As cocatalyst diethylaluminiumchloride (DEAC, 0.15 mmol/l) was used. The catalyst residues amounted to 4 ppm Ti and 182 ppm Cl. The LLDPE had a d=909 kg/m³, an MI=3.8 dg/min and an FI=30.

EXAMPLE XIV

Polymerization

The polymerization was carried out as described in Example VII using the catalyst prepared according to Example VI at a reactor temperature of 186° C. The catalyst residues amounted to 6 ppm Ti and 147 ppm Cl. The LLDPE had a d=919 kg/m³, an MI=4.5 dg/min and an FI=38.

All polymerization examples and comparative experiments were carried out under identical reactor conditions. This implies: the same temperature (i.e. 186° C.+1° C.), the same pressure, and above all the same monomer and comonomer flow rates to the reactor. As a consequence, a difference in comonomer conversion is manifested in the density: higher comonomer conversions, lower density. The width of the molecular weight distribution is manifested in the flow index: the higher the flow index, the wider the molecular weight distribution.

The catalyst activity is manifested in the residual titanium and chlorine contents: the lower these residual contents, the higher the activity of the catalyst used, for the resulting polyethylene is not washed. Examples VII up to and including XIV prove that the moment that component (c) is added, before, after or simultaneous with component (d), greatly affects the activity (a low residual titanium content) of the catalyst. The polyethylenes produced in addition have a considerably lower density, which means comonomer conversion is higher than in the comparative experiments.

We claim:

1. A process for the homopolymerization of ethylene or copolymerization of ethylene with one or more α-olefins having 3 to 12 carbon atoms and optionally one or more non-conjugated dienes in solution, comprising conducting said homopolymerization or said copolymerization under effective polymerization conditions in the presence of a catalyst composition which consists essentially of a catalyst composition A and a cocatalyst component B, wherein catalyst component A is obtained by a reaction whose reactants consist essentially of the following components:

(a) one or more organomagnesium compounds with alkyl groups, alkoxy groups or a combination of alkyl groups and alkoxy groups bonded to the magnesium, (b) at least one member selected from the group consisting of chlorine-containing organoaluminum compounds and chlorine-containing organoboron compounds, (c) one or more oxygen-containing compounds selected from the group consisting of alcohols, glycols, silanols and ethers, (d) one or more transition metal compounds having bonded thereto alkyl, alkoxy, halogenide groups or a combination thereof wherein the transition metal is at least one selected from the group consisting of titanium, zirconium, hafnium and vanadium in the order (a), (b), (c), (d), or (a), (b), (d), (c), or (a), (b) and a reaction product of (c) and (d)=(e); wherein the components (a)–(e) or combinations thereof are used in such a quantity that in the preparation of said catalyst component (A) the atomic ratio of aluminum and boron of (b) to magnesium of (a) is between 2 and 15, the atomic ratio of magnesium of (a) to transition metal from (d) or (e) is between 3 and 100, the atomic ratio of oxygen from (c) or (e) to the magnesium of (a) is between 0.1 and 5; following which catalyst A is washed and said cocatalyst component B is at least one member selected from the group consisting of organoaluminum compounds and boron compounds.

2. A process according to claim 1, wherein in (d) the transition metal compound is a titanium compound represented by the formula:

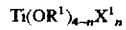

or

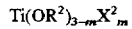

wherein $R^1$ and $R^2$ are the same or different and represent hydrocarbon radicals having 1 to 20 carbon atoms, $X^1$ and $X^2$ are halogen atoms, $0 \leq n \leq 4$, and $0 \leq m \leq 3$.

3. A process according to claim 1, wherein (a) is butyloctylmagnesium, (b) is sesquiethylealuminumchloride, (c) is 2-ethylhexanol and (d) is tetrabutoxytitanium.

4. A process according to claim 1, wherein said cocatalyst component B is triethylaluminum or diethylaluminumchloride.

5. A process according to claim 1, wherein said catalyst component b is at least one compound represented by the formula $M(R)_{3-m}X_m$, wherein M represents an aluminum or boron atom, R represents a hydrocarbon group or an alkoxy group with 1–20 carbon atoms, X represents a halogen atom and m has value of 1–2.

6. A process according to claim 1, wherein the atomic ratio of the oxygen-containing compound, component (c), relative to the magnesium, component (a), is between 0.5 and 4.

7. A process according to claim 1, wherein the atomic ratio of magnesium of component (a) to transition metal of component (d) is between 3 and 50.

8. A process according to claim 1, wherein the atomic ratio of aluminum and boron in (b) to the magnesium of (a) is between 2.5 and 10.

9. A process according to claim 1, wherein (d) is at least one member selected from the group consisting of tetrabutoxytitanium and titaniumtetrachloride.

10. A process according to claim 1, wherein in (d) the transition metal compound is a titanium compound.

11. A process according to claim 1, wherein (c) is at least one member selected from the group consisting of hexanol, decanol, 2-ethylhexanol, t-butyl-methyl-ether, diethylether, triphenylsilanol, anisole, 1,1,3,3-tetraphenyldisiloxane-1,3-diol, 1,2-dihydroxyethane, 1,3-dihydroxypropane 2-ethyl-hexane-1,3-diol and a mixture of any thereof.

12. A process according to claim 1, wherein (a) is at least one member selected from the group consisting of ethylbutylmagnesium, butyloctylmagnesium and dihexylmagnesium, said member being optionally converted in situ to an alkyl-alkoxy-magnesium compound.

13. A process according to claim 1, wherein (b) is at least one member selected from the group consisting of diethylaluminiumchloride, sesquiethylaluminiumchloride, monoethylaluminiumdichloride and a mixture of any thereof.

14. A process for the homopolymerization of ethylene or copolymerization of ethylene with one or more α-olefins having 3 to 12 carbon atoms and optionally one or more non-conjugated dienes in solution, comprising conducting said homopolymerization or said copolymerization under effective polymerization conditions in the presence of a catalyst composition, wherein said catalyst composition is obtained by combining a catalyst component A and a cocatalyst component B, wherein catalyst component A and cocatalyst component B are fed into a reactor either separately or in combination, wherein said catalyst component A is obtained by a reaction whose reactants consist essentially of the following components:

(a) one or more organomagnesium compounds with alkyl groups, alkoxy groups or a combination of alkyl groups and alkoxy groups bonded to the magnesium, (b) at least one member selected from the group consisting of chlorine-containing organoaluminum compounds and chlorine-containing organoboron compounds, (c) one or more oxygen-containing compounds selected from the group consisting of alcohols, glycols, silanols and ethers, (d) one or more transition metal compounds having bonded thereto alkyl, alkoxy, halogenide groups or a combination thereof wherein the transition metal is at least one selected from the group consisting of titanium, zirconium, hafnium and vanadium in the order (a), (b), (c), (d), or (a), (b), (d), (c), or (a), (b) and a reaction product of (c) and (d)=(e); wherein the components (a)–(e) or combinations thereof are used in such a quantity that in the preparation of said catalyst component (A) the atomic ratio of aluminum and boron of (b) to magnesium of (a) is between 2 and 15, the atomic ratio of magnesium of (a) to transition metal from (d) or (e) is between 3 and 100, the atomic ratio of oxygen from (c) or (e) to the magnesium of (a) is between 0.1 and 5; following which catalyst A is washed; and said cocatalyst component B is at least one member selected from the group consisting of organoaluminum compounds and boron compounds.

* * * * *